Dec. 14, 1937.  J. FIEUX  2,102,524
CENTRIFUGAL CLUTCH
Filed April 9, 1936  3 Sheets-Sheet 1

Inventor
Jean Fieux
By
Cameron, Kerkam & Sutton
Attorneys

Dec. 14, 1937.  J. FIEUX  2,102,524
CENTRIFUGAL CLUTCH
Filed April 9, 1936   3 Sheets-Sheet 2

Inventor
Jean Fieux
By
Cameron, Kerkam + Sutton
Attorneys

Dec. 14, 1937.  J. FIEUX  2,102,524
CENTRIFUGAL CLUTCH
Filed April 9, 1936  3 Sheets-Sheet 3

Inventor
Jean Fieux
By
Cameron, Kerkam + Sutton
Attorneys

Patented Dec. 14, 1937

2,102,524

UNITED STATES PATENT OFFICE 2,102,524

CENTRIFUGAL CLUTCH

Jean Fieux, Paris, France, assignor of one-half to Schneider & Cie, Paris, France, a joint-stock company of France Application April 9, 1936, Serial No. 73,568
In France April 16, 1935

10 Claims. (Cl. 192—105)

Automatic friction clutches are already commonly employed, particularly for connecting an engine of low or moderate power to the driving mechanism of a vehicle (motor car, rail motor car, locotractor and the like). In particular, numerous devices constructed according to the Letters Patent No. 1,481,593 have been applied principally to petrol engines, but these devices have been found to be inadequate in their present form when applied to powerful engines, of the Diesel type, for example, intended for traction.

The increases which have been sought concurrently for the torque and for the speed of heat engines have, in fact, revealed the defective operation under these conditions of the automatic clutches of the type referred to hereinbefore, comprising a friction band applied to the interior of a drum by the centrifugal effect which is exerted simultaneously on the mass of the said band itself and on an appropriate system of auxiliary masses, even with the correcting means which has already been proposed and which comprises interposing between the two extremities of the coupling band a spring under tension exerting an effect antagonistic to that of the centrifugal force and thereby ensuring the disengagement of the friction surfaces for a predetermined minimum speed assumed by the driving shaft.

It has been discovered in particular that the interposed antagonistic device, if applied in a suitably selected form and at suitably selected points, may accomplish not only the function of an automatic disengagement device but also the function of an absorber of the shocks and vibrations which make themselves felt with an intensity increasing with the engine power. It has also been discovered that this double effect may be ensured under still better conditions by means of a new and particular form of construction of the coupling band.

Two centrifugal clutches of the known type referred to hereinbefore and embodying the application of the means according to the present invention will be described by way of example hereinafter.

Figure 1:
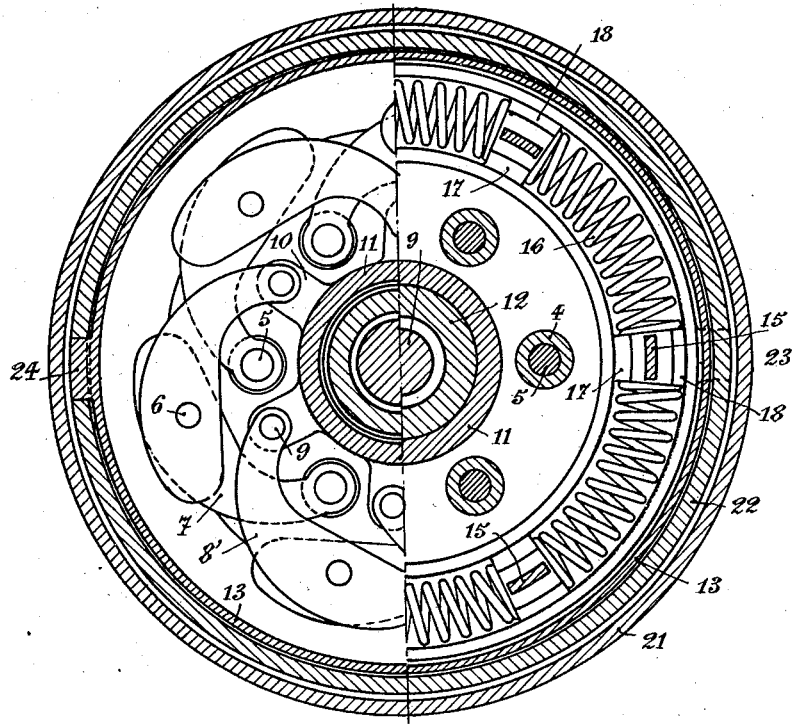
Figure 2:
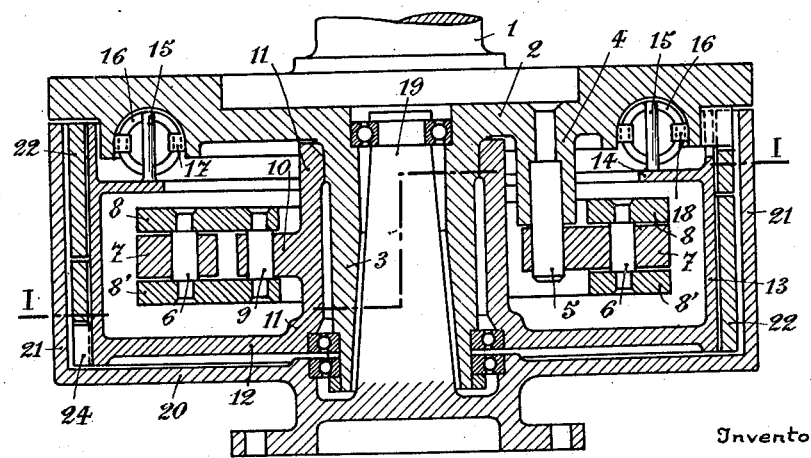
Figure 3:
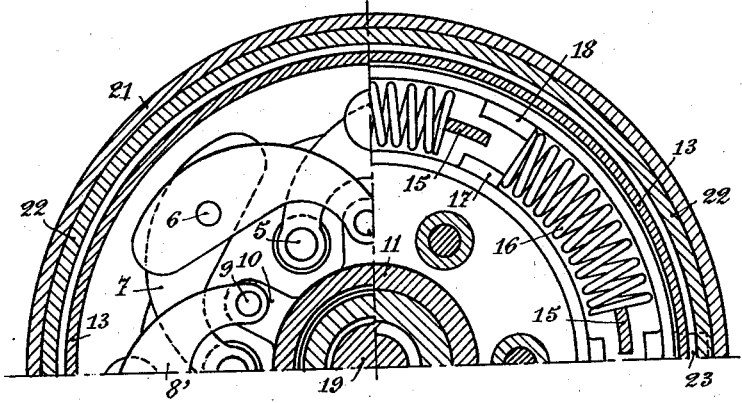
Figure 4:
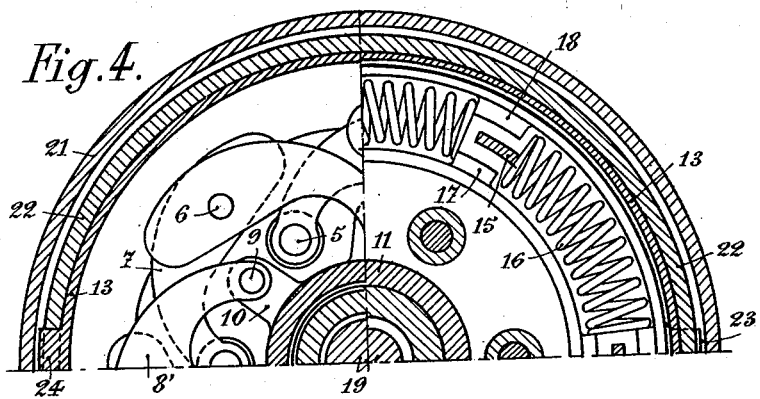
Figure 5:
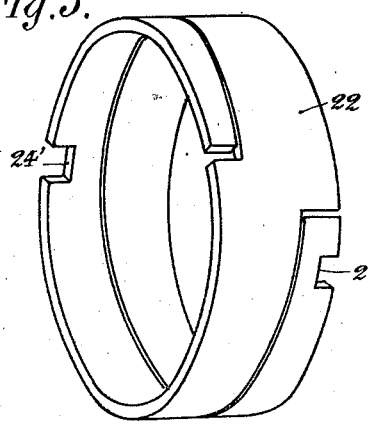
Figure 6:
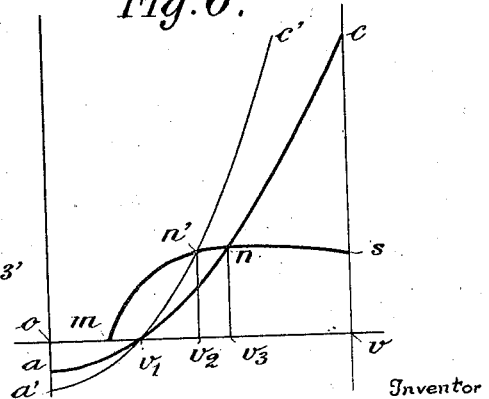
Figure 7:
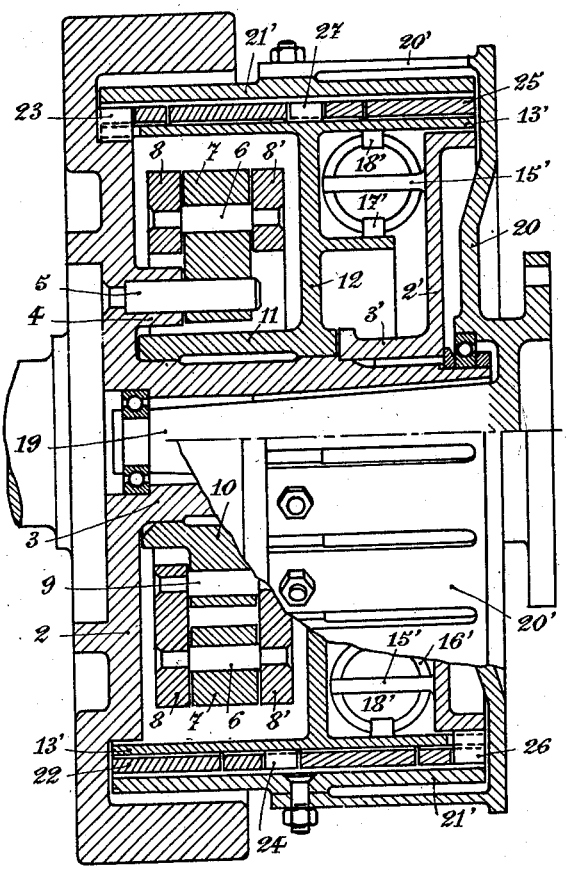

In the accompanying drawings, Figure 1 is a cross section on the line I—I of Figure 2, and Figure 2 is an axial section, of one form of clutch embodying the invention with the elements thereof shown in their inoperative positions. Figures 3 and 4 are half sections likewise on the line I—I of Figure 2, the band being shown applied to the friction drum and to the supporting drum, respectively. Figure 5 is a perspective view of the friction band. Figure 6 is a diagram of the torque which may be developed and the torque which may be transmitted shown as a function of the speed of the driving shaft. Figure 7 is an axial section, with a portion shown in elevation, of a double band clutch according to the invention.

Figure 8:
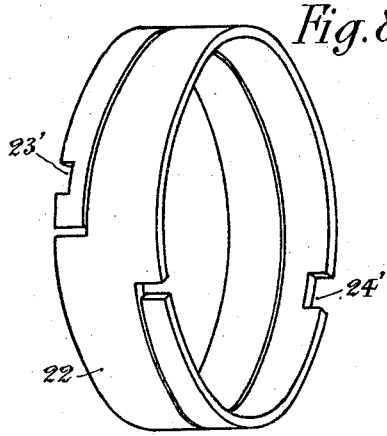
Figure 9:
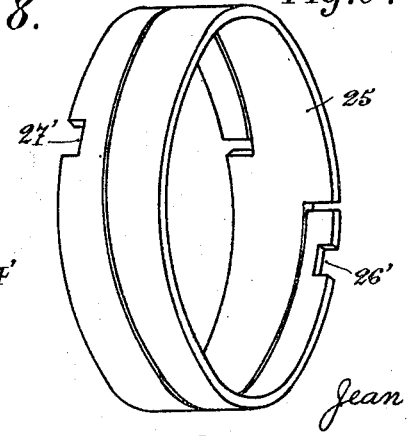

Figures 8 and 9 are perspective views of the twin bands of the device shown in Figure 7.

Referring now to the drawings, there is shown therein a driving shaft 1 to the end of which is fixed a flywheel disc 2 comprising a hub 3 and a certain number of bosses 4 disposed concentrically to the shaft and at equal intervals around the said hub. In each of the said bosses, a pin 5 is fixed parallel to the driving shaft. Groups of centrifugal masses pivoted together by floating pins 6 comprise masses 7, called the driving masses, pivotally mounted on the pins 5, and twin masses 8, 8', called the driven masses, pivotally mounted on a supporting drum or clutch actuating member comprising a hub 11, a web 12 and a rim 13 which constitutes one of the new elements of the improved clutch according to the invention. The mounting of the driven masses is effected by means of pins 9 which are carried by a plurality of bosses 10 disposed concentrically and at equal intervals around the hub 11 of the said supporting drum, the said hub rotating freely on the hub 3 of the disc 2.

In the device shown in Figures 1, 2, 3 and 4, the said drum 11—12—13 has projecting parallel to the axis thereof from an inwardly directed flange 14 a certain number of fingers 15 inserted into the gaps between a plurality of peripherally arranged coil springs 16 which are housed in an annular groove of substantially semicircular cross section formed in the inner face of disc 2, the ends of said springs bearing against lugs 17 and 18, integral with the flywheel disc 2 and extending toward one another in a radial direction from opposite sides of the groove in which the springs 16 are mounted. The width of the lugs is such that normally, that is to say, in the inoperative position of the clutch, the intermediate fingers 15 lie between the lugs out of contact with the springs but at a slight distance from the latter. This peripheral arrangement of the springs which, as will be seen hereinafter, enables them to accomplish the double function of a disengaging device and shock and a noise absorber is one of the essential features of the improved clutch according to the invention.

The driven shaft 19 journalled in the hub 3 is integral with a plate 20 parallel and closely adjacent to the web 12 of the supporting drum, said plate also having formed integrally therewith a friction rim or drum 21 surrounding but spaced from the rim 13 of the supporting drum. Interposed between the friction drum 21 and the rim 13 of the supporting drum is a helically wound, spring coupling or clutch band 22 which is adapted to be expanded into frictional engagement with the inner surface of said drum 21 to couple the driving and driven shafts together. The said friction band 22 is fixed at one extremity to a lug 23 integral with the flywheel disc 2 and adjacent the other extremity to a lug 24 integral with the rim 13 of the supporting drum, the lugs 23 and 24 respectively engaging recesses 23' and 24' provided in the said friction band (Figure 5).

In the device shown in Figures 7 to 9, the hub 3 is secured to a counter-hub 3' which in turn carries a counter-plate 2' having projecting therefrom a certain number of fingers 15' inserted between the springs 16' which are peripherally arranged in the annular space bounded by the outer portion of counter-plate 2', the corresponding portion of web 12 of the supporting drum, rim 13' of the latter and an intermediate collar projecting toward counter-plate 2' from web 12. The ends of springs 16' bear against lugs 17' and 18', the latter in their turn being integral with the intermediate collar of web 12 and rim 13', respectively. In this example, the plate 20 carries a friction drum 21' by means of flexible blades or arms 20' which, as shown in Figure 7, are connected to said drum at its midsection. A first friction band 22 is fixed at one extremity to a lug 23 integral with the flywheel disc 2 and adjacent the other extremity to a lug 24 integral with the rim 13' of the supporting drum, the lugs 23 and 24 engaging respectively the recesses 23' and 24' provided in the said first band. A second friction band 25 is fixed at one extremity to a lug 26 integral with the counter-plate 2' and adjacent the other extremity to a lug 27 integral with the rim 13', the lugs 26 and 27 engaging respectively the recesses 26' and 27' provided in the said band 25.

The lugs 24 and 27 occupy on the rim 13' positions corresponding to two diametrically opposite generating lines; the lugs 23 and 26 likewise occupy positions 180° apart relatively to the axis of the device.

When the device is inoperative, the coupling band occupies a floating position between the supporting drum and the friction drum, its play being preferably smaller with respect to the first than with respect to the second.

In starting, the driving shaft 1 and flywheel disc 2 or 2' move ahead a short distance rotationally relatively to the supporting drum, draw the pivot pins 5 of the centrifugal masses closer to the axis of rotation, and tighten the coupling band or bands 22, 25 down around the rim 13 or 13' of the supporting drum, as indicated in Figure 4. At the same time, the springs 16 or 16' are compressed (by the lugs 17 and 18 in the embodiment of Figures 1-5, or by the fingers 15' in the device of Figures 7-9) so as to cushion the relative movement of the parts and prevent any shocks which might occur due to the bosses 4 coming into contact with the bosses 10 or the ends of masses 8 and 8'. At the end of this slight relative movement, the supporting drum becomes driven by the driving shaft and takes up the rotation thereof. As the speed of rotation increases, the interconnected weighted ends of masses 7, 8 and 8' move outwardly under the influence of centrifugal force and return the elements to their original positions, expansion of the springs 16 or 16' taking place at this time due to movement of the fingers 15 (Figures 1-5) or lugs 17' and 18' (Figures 7-9) relatively to the complementary elements carried by the flywheel disc against which the opposite ends of the springs rest. As the speed of rotation increases still further the centrifugally created outward movement of the masses 7, 8 and 8' results in a forward rotation of the supporting drum relatively to the driving shaft and flywheel disc 2, against the resistance of the springs 16 or 16', and a consequent expansion of the coupling band or bands 22, 25 until, when a predetermined speed is reached, this expansion brings the band or bands into frictional clutching engagement with the inner surface of friction drum 21 or 21' and drivingly couples the driven shaft 19 to the driving shaft 1. When the driving shaft slows down the centrifugal masses move inwardly again, the springs expand, the flywheel disc moves forward relatively to the supporting drum, and the coupling band or bands are contracted to release the frictional clutching engagement with the drum of the driven shaft. Any shocks or oscillations which might occur due to variations in the speed of rotation of the driving shaft tending to effect relative movement of the parts beyond their original, inoperative positions (that is, toward the positions shown in Figure 4) will be absorbed by the springs in the same manner as described above with reference to the starting operation.

The torque which can be transmitted by the known type of device under consideration may be represented by a parabola such as $av_1c$ (see the diagram in Figure 6), as a function of the different speeds $ov_1$, $ov_2$, $ov_3$ ... $ov$ of the engine, $oa$ representing the antagonistic torque which the springs 16 or 16' as a whole oppose to the expansion of the system of auxiliary masses 7, 8 and 8', and $ov_1$ representing the speed of the engine commencing from which the fingers 15 or 15' impose an additional deflection on the said springs, which deflection may attain that shown in Figure 3. The mean maximum torque developed by the engine is represented on the same diagram by the curve $mn's$ $om$ representing the lowest speed at which the declutched engine can rotate and $ov_3$ representing the speed commencing from which the clutch can transmit the maximum torque of which the engine is capable.

It is advisable to give $ov_1$ a value distinctly greater than that of $om$ in order to protect in a reliable manner the running of the engine. On the other hand, however, the speed $ov_3$ should be reduced as much as possible, especially in the case of an engine of the Diesel type which is still capable of producing a high torque at relatively low speeds, in order to reduce to a minimum the fuel consumption and the wear of the clutch. We are thus led to consider another parabola $a'v_1c'$, for example, to represent the torques which may be transmitted, the said parabola corresponding simultaneously to a more considerable system of masses and to a system of springs capable of developing a greater antagonistic torque, represented by $oa'$.

Since the springs 16 and 16' are arranged to act in parallel at a relatively large distance from the axis of the device, they are in fact capable of sufficient tension and flexibility, irrespective of the working characteristic adopted, the various members assuming the relative positions shown in Figure 3 when the clutch is engaged. Furthermore, the said springs constitute simple and effective shock-absorbing stops for the fingers 15 and 15' and the supporting drum 11—12—13 which participates to a certain extent in the vibrations to which the auxiliary masses 7, 8 and 8' are subjected, the shock-absorbing deflection (Figure 4) being communicated by the basal extremity of each of the springs, that is to say by the extremity opposite to that which receives the pressure for automatic disengagement. Thus, the oscillatory movements of the web 12 of the supporting drum are reduced to low amplitudes relatively to the flywheel disc 2, consequently eliminating any causes of considerable shocks and noises, which would be due to the bosses 4 coming into contact with the bosses 10 and which are actually produced in the known devices of the same type.

In the declutched position, the friction coupling member or band 22, 25 is held spaced away from the friction drum 21, 21' by the rim 13, 13' of the supporting drum. Any residual friction is thus prevented and the disengagement of the driving and driven shafts is effected in a perfect manner.

The use of twin bands offset angularly (preferably 180°) in opposition makes it possible to construct clutches of very high powers, having a relatively small transverse bulk and particularly suitable for locomotives with mechanical transmission. It enables a friction drum having a long generating line to be employed and consequently the coefficient of wear of the friction surfaces to be limited. Above all, it enables the various thrusts exerted laterally on the drum during slipping under load to practically cancel each other, and thus contributes to the improvement in the operation of the clutch.

Finally, due to the radial mobility imparted by the resilient mounting of the friction drum 21' on the plate 20 of the driven shaft (Figure 7), expansions have no disagreeable action on the regularity of working. In a clutch constructed according to the indications give in Figure 7, therefore, advantage can largely be taken of the progress which has been made in the course of the last few years in the quality of friction linings in order to ensure the starting of the heaviest hauled vehicles, and particularly trains running on railways.

Preferably, a metal of low coefficient of expansion will be chosen for making the actual bands.

While two forms of the invention have been described and illustrated in the accompanying drawings, it will be obvious that the invention is not limited to the exact structures shown but is capable of a variety of mechanical embodiments. Various changes, which will now suggest themselves to those skilled in the art, may be made in the form, details of construction and arrangement of the parts without departing from the spirit of the invention. Reference is therefore to be had to the appended claims for a definition of the limits of the invention.

I claim:

1. A torque limiting friction clutch of the type adapted to automatically connect and disconnect rotatable driving and driven members at a predetermined speed of rotation of the driving member comprising a drum secured to the driven member, a helical coupling band disposed within said drum normally out of contact with the inner surface thereof but adapted to be expanded into frictional engagement therewith to couple the driving and driven members together, a clutch actuating member mounted on said driving member and capable of rotation relatively thereto, said coupling band being anchored at its ends relatively to said driving and actuating members respectively, centrifugally actuatable weighted members operatively connecting said driving and actuating members in such a manner that movement of said weighted members under the influence of centrifugal force produces relative rotation between said driving and actuating members and expansion or contraction of said coupling band, a plurality of peripherally arranged, coil springs each bearing at both of its ends against stop members carried by one of said driving and actuating members, and means carried by the other of said driving and actuating members and cooperative with said stop members for effecting compression of each of said springs in either direction, whereby said springs may be compressed at one end for automatic operation of the clutch and at the other end for absorption and cushioning of the shocks resulting from movement of the driving member forwardly relative to the actuating member.

2. A torque limiting friction clutch of the type adapted to automatically connect and disconnect rotatable driving and driven members at a predetermined speed of rotation of the driving member comprising a drum secured to the driven member, a helical coupling band disposed within said drum normally out of contact with the inner surface thereof but adapted to be expanded into frictional engagement therewith to couple the driving and driven members together, a clutch actuating member mounted on said driving member and capable of rotation relatively thereto, said coupling band being anchored at its ends relatively to said driving and actuating members respectively, centrifugally actuatable weighted members pivotally connected at their inner ends to said driving member and actuating member respectively and having their outer ends pivotally connected together, whereby movement of the outer ends of said weighted members under the influence of centrifugal force produces relative rotation between said driving and actuating members and expansion or contraction of said coupling band, a plurality of peripherally arranged coil springs disposed within said drum with both ends of each normally bearing against stop members carried by one of said driving and actuating members, and a spring compressing member carried by the other of said driving and actuating members and positioned intermediate each two adjacent spring ends bearing against said stop members, whereby said springs may be compressed at one end for automatic operation of the clutch and at the other end for absorption and cushioning of the shocks resulting from movement of the driving member forwardly relative to the actuating member.

3. A torque limiting friction clutch of the type adapted to automatically connect and disconnect rotatable driving and driven members at a predetermined speed of rotation of the driving member comprising a drum secured to the driven member, a helical coupling band disposed within said drum normally out of contact with the inner surface thereof but adapted to be expanded into frictional engagement therewith to couple the driving and driven members together, a clutch actuating member mounted on said driving member and capable of rotation relatively thereto, said coupling band being anchored at its ends relatively to said driving and actuating members respectively, centrifugally actuatable weighted members operatively connecting said driving and actuating members in such a manner that movement of said weighted members under the influence of centrifugal force produces relative rotation between said driving and actuating members and expansion or contraction of said coupling band, a plurality of springs arranged in a ring and each confined between stop members fixed relatively to one of said driving and actuating members, each of said stop members being interposed between the ends of and receiving the thrusts of two adjacent springs, and a plurality of spring compressing fingers equal in number to said springs fixed relatively to the other of said driving and actuating members and extending between the ends of said springs, whereby said springs may be compressed at one end for automatic operation of the clutch and at the other end for absorption and cushioning of the shocks resulting from movement of the driving member forwardly relative to the actuating member.

4. A torque limiting fraction clutch of the type adapted to automatically connect and disconnect rotatable driving and driven members at a predetermined speed of rotation of the driving member comprising a drum secured to the driven member, a pair of helical coupling bands disposed within said drum normally out of contact with the inner surface thereof but adapted to be expanded into frictional engagement therewith to couple the driving and driven members together, a clutch actuating member mounted on said driving member and capable of rotation relatively thereto, each of said coupling bands being anchored at its ends relatively to said driving and actuating members respectively with the corresponding points of anchorage of the two bands angularly off-set with respect to one another, centrifugally actuatable weighted members operatively connecting said driving and actuating members in such a manner that movement of said weighted members under the influence of centrifugal force produces relative rotation between said driving and actuating members and expansion or contraction of said coupling bands, a plurality of peripherally arranged coil springs each bearing at both ends against stop members carried by one of said driving and actuating members, and means carried by the other of said driving and actuating members and cooperating with said stop members for effecting compression of each of said springs in either direction.

5. A clutch according to claim 1, including means for resiliently mounting said drum on said driven member whereby the drum may move radially with respect to said member.

6. A clutch according to claim 1, including a plurality of radially flexible arms securing said drum to said driven member whereby the drum may move radially with respect to said member.

7. A clutch according to claim 4, including a plurality of circumferentially spaced, flexible arms, each secured to said driven member at one end and at the other end to said drum at its mid-section.

8. A torque limiting friction clutch of the type adapted to automatically connect and disconnect rotatable driving and driven members at a predetermined speed of rotation of the driving member comprising a friction drum secured to the driven member, a clutch actuating member mounted on said driving member and capable of rotation relatively thereto, a supporting drum carried by said actuating member, a helical coupling band disposed between said drums normally supported on said supporting drum out of contact with the inner surface of said friction drum but adapted to be expanded into frictional engagement therewith to couple the driving and driven members together, said coupling band being anchored at its ends relatively to said driving member and supporting drum respectively, centrifugally actuable weighted members operatively connecting said driving and actuating members in such a manner that movement of said weighted members under the influence of centrifugal force produces relative rotation between said driving and actuating members and expansion or contraction of said coupling band, a plurality of peripherally arranged coil springs disposed within said supporting drum with both ends of each normally bearing against stop members carried by one of said driving and actuating members, and a plurality of spring compressing fingers carried by the other of said driving and actuating members each positioned intermediate but normally out of contact with the adjacent ends of two of said springs bearing against said stop members, whereby said springs may be compressed at one end for automatic operation of the clutch and at the other end for absorption and cushioning of the shocks resulting from movement of the driving member forwardly relative to the actuating member.

9. In a centrifugal clutch, a drive shaft, a driven shaft, a disc on said drive shaft, a plurality of centrifugal members pivotally mounted at their inner ends on said disc, a drum-like member enclosing said centrifugal members, a plurality of centrifugal members pivotally mounted at their inner ends on said drum-like member and having their outer ends pivotally connected with the outer ends of said first named centrifugal members, a friction surface fixed to said driven shaft and in spaced relation to and surrounding said drum-like member, an expansible friction element surrounding said drum-like member and within said friction surface, one end of said friction element being fixed to said disc and the other to said drum-like member, a circumferential recess formed in said disc, a plurality of resilient elements housed in said recess, a plurality of lugs fixed to said disc against which said resilient elements normally abut, and a plurality of elements fixed to said drum-like member and extending between the adjacent ends of said resilient elements, whereby said resilient elements both oppose movement of the clutch elements toward clutching position and also absorb shocks due to movement of said elements in unclutching direction.

10. In a clutch of the character described, a drive shaft, a driven shaft, a disc on said drive shaft, a recessed hub on said disc, said driven shaft taking bearing in said hub, a plurality of weighted members pivotally mounted on said disc, a supporting drum surrounding said hub and enclosing said weighted members, a plurality of weighted members pivotally mounted on said drum and having pivoted connection with said first named weighted members, a friction surface on said driven shaft surrounding said drum, a coiled, expansible friction element between said drum and said friction surface, said friction element being fixed at one end to said drum and at the other to said disc, a plurality of resilient elements arranged in a ring about the axis of said shafts, a plurality of projections on said drum extending between the adjacent ends of said resilient elements, and additional projections on said disc also extending between the adjacent ends of said resilient elements, whereby said resilient elements may be compressed in both directions dependent upon the direction of relative rotation between said drive shaft and supporting drum.

JEAN FIEUX.